United States Patent
Wickramasinghe et al.

[11] Patent Number: 5,602,820
[45] Date of Patent: Feb. 11, 1997

[54] METHOD AND APPARATUS FOR MASS DATA STORAGE

[75] Inventors: Hemantha K. Wickramasinghe, Chappaqua; Frederic Zenhausern, Mohegan Lake, both of N.Y.

[73] Assignee: International Business Machines Corporation, Armonk, N.Y.

[21] Appl. No.: 518,946

[22] Filed: Aug. 24, 1995

[51] Int. Cl.$^6$ ........................................ G11B 9/00
[52] U.S. Cl. .................. 369/126; 369/44.25; 369/103; 250/216; 250/306; 250/307; 374/6; 374/120
[58] Field of Search ................................ 369/126, 44.25, 369/275.1, 100, 103; 250/492.2, 305, 306, 307, 216; 374/6, 120

[56] References Cited

U.S. PATENT DOCUMENTS

| | | | |
|---|---|---|---|
| 4,343,993 | 8/1982 | Binning et al. | 250/306 |
| 4,747,698 | 5/1988 | Wickramasinghe | 374/6 |
| 4,941,753 | 7/1990 | Wickramasinghe | 374/120 |
| 4,947,034 | 8/1990 | Wickramasinghe | 250/216 |
| 5,003,815 | 4/1991 | Martin et al. | 250/305 |
| 5,056,080 | 10/1991 | Russell | 369/103 |
| 5,272,330 | 12/1993 | Betzig et al. | 250/216 |
| 5,278,816 | 1/1994 | Russell | 369/103 |
| 5,319,977 | 6/1994 | Quate et al. | 250/306 |
| 5,375,114 | 12/1994 | Hatanaka et al. | 369/126 |
| 5,394,388 | 2/1995 | Hatanake et al. | 369/126 |
| 5,404,349 | 4/1995 | Nose et al. | 369/126 |
| 5,432,771 | 7/1995 | Shido et al. | 369/126 |

OTHER PUBLICATIONS

F. Zenhausern et al, "Apertureless near–field optical microscope", Appl. Phys. Lett. 65 (13) 26 Sep. 1994 pp. 1623–1625.

E. Betzig et al, "Near–field magneto–optics and high density data storage", Appl. Phys. Lett. 61(2), 13 Jul. 1992 pp. 142–144.

D. A. Parthenopoulos et al, "Three–Dimensional Optical Storage Memory", Science, 245, 843, 1989 (Aug. 25).

J. H. Strickler and W. W. Webb, Opt. Lett., 16, 1780, 1991 (Jul. 8).

*Primary Examiner*—Loha Ben
*Attorney, Agent, or Firm*—Stephen C. Kaufman

[57] ABSTRACT

The present invention discloses apparatus and method for decoding high density data encoded in a digital recording media as a series of tags comprising an information bit pattern including a tracking bit pattern. To this end, the invention preferably accesses the data by way of an interferometric near field microscope.

15 Claims, 4 Drawing Sheets

METHOD AND APPARATUS FOR MASS DATA STORAGE

CROSS REFERENCE TO RELATED APPLICATIONS

This application is related to U.S. patent application Ser. No. 405,476 filed Mar. 16, 1995 by H. K. Wickramasinghe and F. Zenhausern (YO995-058); and to U.S. patent application Ser. No. 405,481 filed Mar. 16, 1995 by F. Zenhausern and H. K. Wickramasinghe (YO995-061); and to U.S. patent application Ser. No. 405,068 filed Mar. 16, 1995 by F. Zenhausern and H. K. Wickramasinghe (YO995-065); and to U.S. patent application Ser. No. 405,070 filed Mar. 16, 1995 by H. K. Wickramasinghe and F. Zenhausern (YO994-273), now U.S. Pat. No. 5,538,898; and to U.S. patent application Ser. No. 08/511,169 filed Aug. 4, 1995 by H. K. Wickramasinghe et al (YO995-161); and to U.S. patent application Ser. No. 08/511,166 filed Aug. 4, 1995 by H. K. Wickramasinghe et al (YO995-166); and to U.S. patent application Ser. No. 08/511,579 filed Aug. 4, 1995 by H. K. Wickramasinghe et al (YO995-122). The entire disclosures of those applications, all of which are copending and commonly assigned, are incorporated by reference herein.

FIELD OF THE INVENTION

This invention relates to a novel method and apparatus for mass data storage processing in which access to data is preferably realizable by way of an interferometric near-field system.

INTRODUCTION TO THE INVENTION

We are investigating a method and apparatus suitable for decoding high density data encoded in bit patterns having at least one dimension smaller than the focused spot diameter of an incident electromagnetic radiation, such as for example a laser beam.

Mass data storage processing may be realized by optical memory devices such as CD-ROM and magneto-optical disks (MO). By irradiating a focused laser beam of about one micrometer onto these memory devices, one can read and sometimes record stored information. Typically, optical memories today have recording densities and performance that are higher than magnetic memory devices.

The density of an optical memory device is mainly diffraction limited; even with a focusing lens with high numerical aperture (NA>1), the corresponding radius of the focused beam spot can not be smaller than half the illumination wavelength. Current commercial devices are already close to this resolution limit.

Several approaches have already been demonstrated to overcome this resolution limit. First, more efficient lasers emitting shortened wavelength may be used to record and read dam. Typically, the reduction of wavelength by a factor two can be expected to provide about a fourfold increase in data storage density. However, available instruments comprising a blue-green laser diode device using multilayer compounds grown on GaAs substrates are still at the forefront of the technology, and manufacturing them is expensive. These devices typically afford a factor two increase in data storage density, and further advances by reduction of the wavelength are not in a foreseeable future.

Another approach has been reported in the literature using evanescent waves, due to their nonisotropic properties and location with wavelengths that are shorter than the ordinary propagating wavelength of a laser beam. Although the application of aperture-based Near-Field Scanning Optical Microscopy (NSOM) may potentially be fruitful for recording small bits domains—Betzig et al. demonstrate data densities of $\cong 45$ GBits/inch$^2$ (Betzig et al., Appl. Phys. Lett., 61(2), 142, 1992)—other parameters such as signal-to-noise ratio, reliability and speed are of major importance for practical interest.

It has even been reported that 1000 bits of information can be stored in a diffraction limited spot in a photochemical hole-burning medium (W. E. Moerner, Ed. *Persistent spectral hole-burning: science and applications, Current Topics in Physics*, vol.44, Springer Verlag, Berlin 1988) but its practical use has been hindered by the necessity to cool it at low temperature, e.g., liquid nitrogen temperature.

The development of either multilayered materials (or even multi-discs) or holographic techniques is motivated by searches for improving the density limit by using another spatial dimension; components such as holographic memory devices using orthogonal phase coding or wavelength multiplexing, which combines lasers and detectors operating at slightly different wavelengths in order to increase the signal level, have been developed (D. A. Parthenopoulos et al., Science, 245, 843, 1989). Another way to improve 3D-optical memory recording and reading concerns the use of, for example, a photopolymer used as a data storage media. In this method, data may be recorded as refractive-index variations that arise when photopolymerisation occurs as a result of two photons excitations. Data can be read with a differential interference-contrast microscope, and a memory recording density achieving 1.3 GBits/cm$^3$ has been reported. (J. H. Strickler and W. W. Webb, Opt. Lett.,16, 1780, 1991).

SUMMARY OF THE INVENTION

We have now discovered a novel method and apparatus for high-density data storage in which bit-format data may be read below the diffraction limit, typically down to 100 angstroms spatial resolution.

We obtain interferometric measurements that allow for the detection of a small amount of light, and provide a large detection bandwidth, thereby enabling one to image (see FIG. 4) and reproduce e.g., a 500 Angstrom bit pattern at frequencies as high as about 30 MHz. An advantage of the present invention is that it discloses a novel method and apparatus that enable commercial applications of interferometric near-field storage.

In one aspect, the present invention discloses an apparatus for decoding high density data encoded in a digital recording media as a series of tags comprising an information bit pattern including a tracking bit pattern. The apparatus comprises:

1) a source of electromagnetic radiation for generating an incident wave;
2) means for directing at least a portion of the incident wave to the media;
3) a scatterer acting as an antenna and capable of re-radiating a signal wave, said signal wave developing as an interactive coupling between a tag and said scatterer;
4) means for creating an interference signal based on the signal wave and a reference wave;
5) a high-speed detector for interrogating at least one of the phase and amplitude of the interference signal as a read-out signal;

6) means for interpreting and reproducing the read-out signal; and 7) means for detecting the tracking bit pattern and for controlling the reproduction of the information bit pattern.

In a second aspect, the present invention discloses a method for decoding high density data encoded in a digital recording media as a series of tags comprising an information bit pattern including a tracking bit pattern, the method comprising the steps of:

I) providing an apparatus, said apparatus comprising:

1) a source of electromagnetic radiation for generating an incident wave;

2) means for directing at least a portion of the incident wave to the media;

3) a scatterer acting as an antenna and capable of re-radiating a signal wave, said signal wave developing as an interactive coupling between a tag and said scatterer;

4) means for creating an interference signal based on the signal wave and a reference wave;

5) a high-speed detector for interrogating at least one of the phase and amplitude of the interference signal as a read-out signal;

6) means for interpreting and reproducing the read-out signal; and 7) means for detecting the tracking bit pattern and for controlling the reproduction of the information bit pattern; and II) accessing the high density data by engaging the media with the apparatus such that the scatterer can develop the interactive coupling with each of the series of tags in the presence of the incident wave so that a binary state can be defined.

A preferred realization of the novel method is disclosed below, and features utilization of an interferometric near field apparatus providing super-resolution e.g., 1 nanometer resolution, and fast data transfer rate thereby enabling decoding of a bit pattern below the diffraction limit.

BRIEF DESCRIPTION OF THE DRAWINGS

The invention is illustrated in the accompanying drawing, (not drawn to scale), in which.

DETAILED DESCRIPTION OF THE INVENTION

We develop the detailed description by first disclosing an apparatus in which access to data may be performed by operating an interferometric near-field system that is preferably employed as a detector. To this end, attention is directed to FIG. 1, which shows in overview such a generalized apparatus 10 operating in a reflection mode.

Figure 1:
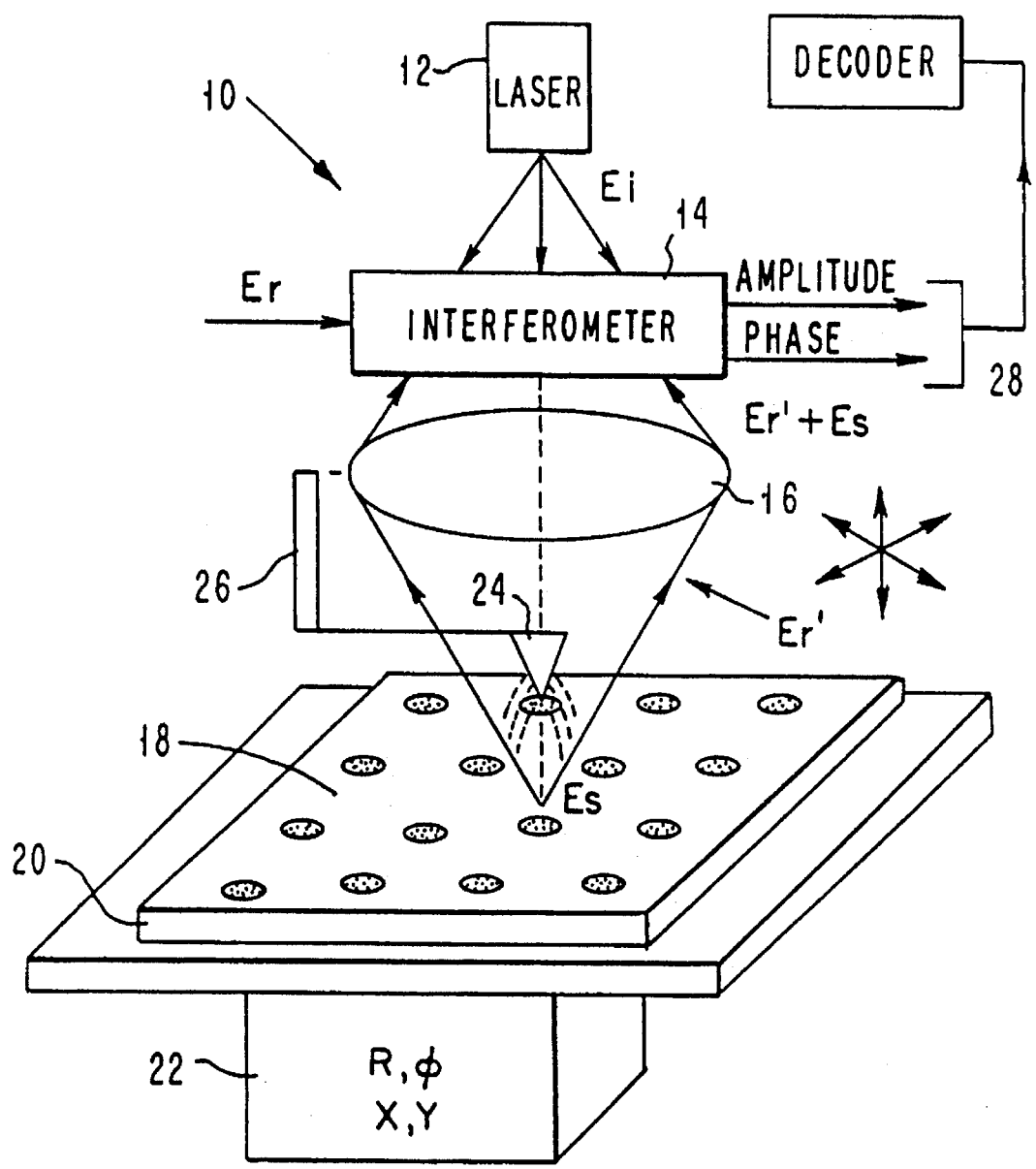
FIG. 1 shows in overview a principle of an apparatus for high data density storage comprising multi-pole interactive coupling and interferometric detection, preferably operating in a reflection mode.

The FIG. 1 apparatus 10 comprises a source 12 of electromagnetic radiation, preferably generating an incident electric field $E_i$, preferably in the optical spectrum, for example from UV to IR. The electric field $E_i$ is directed through a conventional interferometer 14 to a focusing element 16 which preferably comprises an aperture or an objective lens. The interferometer 14 may comprise e.g., a Michelson, Fabry-Perot or Twyman-Green apparatus. The driving electric field $E_i$ is now focused on a bit pattern impressed in a media 18, in turn supported by a substrate 20 for data storage. (Note that in an alternative embodiment comprising a transmission mode, the driving electric field $E_i$ may be focused through a transparent substrate illuminating the data bits sensed by a probe). The substrate 20 for data storage can be of various shapes such as rectangular with high density data stored transversely in lines or circular such as an optical disc. The substrate 20 for data storage can be held on a positioning system 22 operating a rotation or a translation action.

FIG. 1 also shows a scatterer probe sensor 24 preferably placed with respect to the bits pattern 18 such that a distance between the probe 24 and at least a portion of the media surface is smaller than the source 12 radiation wavelength, or a multiple of it. For example, a controlled gap-distance of about 10–100 angstroms may be appropriate in the practice of the present invention, for example, by way of a piezoelectric electric actuator 26. This can be accomplished by the positioning system 22, including a means for positioning the probe 24 and for example a focused laser beam 12 in close proximity (e.g., 100 angstroms) with the media surface. The system 22 can also generate a fast translational or rotational motion between a measurement area of the bits pattern illuminated with the source 12 and the probe 24.

Note that a suitable scatterer probe may comprise a sharp metallic tip or an uncoated silicon and/or silicon nitride tip, or a tip coated with a conductive layer or a molecular system, or a metallic stripe. The probe preferably comprises a high refractive index material. A capability to approach the scatterer probe with the media surface in a near field regime may be realized by e.g., a scanning tunneling microscope (STM), an atomic force microscope (AFM), an aperture or apertureless near-field optical microscope, a near-field acoustic microscope, a thermal microscope or a magnetic force microscope (MFM). A notion of "scanning" references the fact that probe and media may be in relative motion. Reference may be made for example to U.S. Pat. Nos. 5,319,977; 4,343,993; 5,003,815; 4,941.753; 4,947,034; 4,747,698; and Applied Physics Letter 65(13), 26 Sep. 1994, 1623. The disclosures of each of these patents and publications are incorporated herein by reference.

The FIG. 1 probe 24 is capable of re-radiating, in the form of a signal beam -SIG- ($E_s+E'_r$), an incident radiation beam, the signal beam comprising carrier beam $E_r$, combined with bit 18 property information encoded in the scattered field $E_s$, for example, as a probe-bit dipole-dipole coupling. The signal beam -SIG- comprises a scattered electromagnetic field variation wave $E_s$, due preferably to the probe 24 vibrating (or moving relatively) in close proximity to the media 18 surface.

Note that the FIG. 1 signal beam SIG illustrates an electromagnetic wave packet representative of media properties and comprising encoded wave information derivable from a multi-pole interactive coupling between probe and media.

For example, the incident radiation $E_i$ can drive this action such that a dipole-dipole coupling interaction may be created between probe dipole and media dipole.

FIG. 1 further shows that the focusing element 16, for example, a lens, helps in creating an interference signal -IS- based on the signal beam ($E_s+E'_r$) and a reference beam ($E_r$), and for directing the interference signal through the interferometer 14. An output signal 28 of the interferometer 14 can measure either the amplitude of ($E_s+E'_r$) or its phase difference with a reference beam $E_r$. Note that a self-interference phenomena can be alternatively exploited and comprises spatially separating the beam 12 in several components having phase differences that are subsequently made to interfere.

As illustrated in the fundamental FIG. 1, it should be noted that the incident light can be directed to a scatterer either through the media (transmission mode) or by reflection at its surface. In this latter case, particular attention has to be taken to discriminate the scattered signal against spurious reflected light. For the practical value of the operation of the invention, only a reflection case is described below.

As alluded to above, the FIG. 1 apparatus may be used in a transmission mode by setting up a transparent media, and operating mutatis mutandis visa vis the apparatus of FIG. 1.

Figure 2:
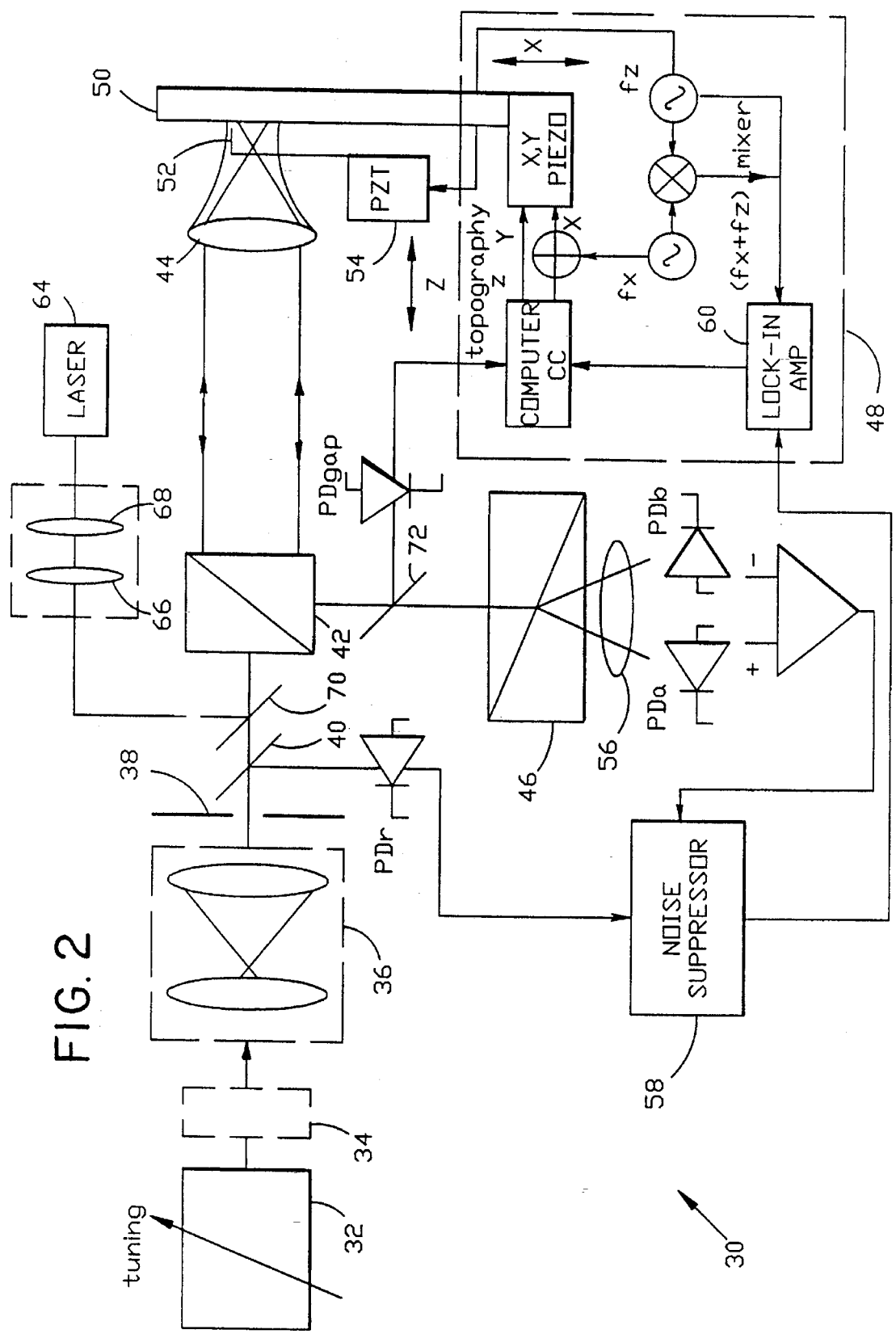
FIG. 2 provides a schematic for describing a preferred embodiment operating according to the invention.

Attention is now directed to FIG. 2, which shows details of a preferred apparatus 30 for the realization of the present method, which details are consistent with the generalized FIG. 1 apparatus 10.

The FIG. 2 apparatus 30 comprises an interferometer and includes the following components: an electromagnetic source, preferably a tunable wavelength. (e.g., 400 nm<$\lambda$>2500 nm) laser 32, an optional acousto-optic modulator 34 in order to prevent spurious back reflection of light generating laser noise; a special beam expander 36 for relative beam and measurement area movement; an aperture 38; a means for splitting an incoming lightwave into first and second lightwaves comprising a pellicule beam splitter 40; a polarising beam splitter 42; a transmission/collection optics (preferably a Nomarski Oil/dark-field objective) 44; a Wollaston prism 46; and, 3 photodetectors $PD_n$. FIG. 2 shows in association with the interferometer an optical sensor and a set of electronics 48 (enclosed by the broken-border box in FIG. 2) that permits both imaging and scatterer probe-media distance feedback regulation with at least nanometer accuracy. Preferably using an AFM feedback, one can therefore image while simultaneously accessing data encoded in a media.

In the FIG. 2 illumination pathway, the laser beam of appropriate polarisation first passes through the beam steering unit 36 in order to expand the beam size in accordance with the objective aperture 44. The laser beam can be adjusted continuously within the beam steering unit 36 by preferably using a piezoelectric positioning system (e.g., x-y-z PZT tube) allowing small motion with nanometer accuracy. This action, in conjunction with electronics disclosed below with reference to FIG. 3, can act as a means for detecting a tracking bit pattern and for controlling a reproduction of an information bit pattern. The beam steering is also controlled by the image-collection electronics 48 for relatively positioning the focused spots, a measurement area of a media 50 and a scatterer 52, while the scanned beam is traced back and forth.

The expanded laser light passes through the aperture 38 (preferably matching geometries of the transmission/collection optics 44) in which an angular discrimination of the incident radiation distribution can select a total internal reflection illumination. Typically, the pellicle beam splitter 40 reflects about 10% of the incident radiation to a reference arm of the interferometer to a detector, preferably a photo-diode $PD_R$ and transmits about 90% of the incident radiation to the polarising beamsplitter 42.

The beam preferably is imaged to a plane wave that overfills the back aperture of the Nomarski objective 44 which focuses the plane wave to two diffraction limited spots in the media 50. Because the aperture 38 blanks the illumination near the center of the beam, the exciting light wave propagates as an evanescent wave in the area illuminated in the media.

When a scatterer 52 that can operate various motions relative to the media 50 at different frequencies (e.g., resonance frequency) with the help of a three-coordinate piezoelectric translator 54, is approached typically a few nanometers close to the media 50, the scatterer 52 is capable of locally perturbing the wave impinging the smallest spatial asperity (e.g., the very end of a pointed STM or AFM tip) of the scatterer 52 resulting in a coupling mechanism between the scatterer dipole and bit dipole of the media.

In terms of an electromagnetic field distribution, the scattered electric field variation due to the vibrating and scanning scatterer 52 in close proximity to the media 50, may be measured by encoding it as a modulation in the phase of a second arm of the interferometer. This modulation action can alternatively be induced by a relative fast motion (e.g., rotation and/or translation) of the media visa vis the scatterer. Modulation actions can also be generated as a time variable multi-pole interactive coupling comprising modulating at least one of the wavelength of the source 32 or using an external applied electromagnetic field to the probe-bit area.

The optical signal resulting from the dipole interaction is collected by the objective 44, and reflected through the polarising beamsplitter 42 to a Wollaston prism 46 with its axis oriented relative to the Nomarski prism, in order to optimize the interference of the reflected electric fields from the two spots, and to measure the phase of the signal beam ($E_s+E'_r$) which corresponds to the real part of the scattered wave $E_s$.

The light continues through an external lens 56 that focuses the light onto a photodiode $PD_A$ and $PD_B$. The imaginary part of the scattered wave $E_s$ can be detected by orienting the Wollaston prism 46 axis to be aligned with the Nomarski prism 44 axis, so as to separately detect the optical powers in the two spots (without mixing) in the differential photodiode $PD_{A-B}$. This detection arrangement preferably operates at pre-selected frequencies ranging from 100 Hz to 100 MHz, for example, at least greater than 30 MHz.

The output signal of this differential detector preferably is sent to a noise suppressor 58 for further noise improvement, by combining the photocurrent from $PD_{A-B}$ with that from the reference photodetector $PD_R$ which is fed a sample of the incident beam. The noise suppressor output preferably is sent to a lock-in amplifier input 60 in order to demodulate the resultant near-field AC signal carrying interesting information about the media. The output of 60 can be sent to a controller/computer -CC- device for interpreting and reproducing a read-out signal of a bit information pattern.

The experimental arrangement in FIG. 2, apparatus 30 can incorporate, for example, directly through objective 44, an optical feedback system for monitoring the scatter-media surface distance. The scatterer 52 can, as a probe tip, be resonantly vibrated with the aid of the piezo actuator 54, and the vibration amplitude can be detected with the help of a second laser beam 64 at a given wavelength different from that of laser source 32. The optical feedback preferably comprises an assembly of optical elements, for example, lenses 66 and 68 and dichroic filters 70, 72 in order to discriminate the two optical paths of different wavelengths for directing selected light onto the appropriate detectors $PD_n$. By adjusting the optics 66, 68 and 70 with respect to the probe tip 52, one can ensure that the light impinging the rear face of the probe 52 does not interfere with respect to the light impinging the very end of the probe tip 52. The optical detection of the back reflected light from the rear face of the probe 52 is then directed through the electronic set of box 48. The stable operation of the feedback system requires a proper choice of operating parameters (e.g., scan rate . . . ) and light distribution (e.g., focus and alignment of said second laser beam relative to said first beam) in order to minimize any laser noise affecting output signal quality.

Figure 3:
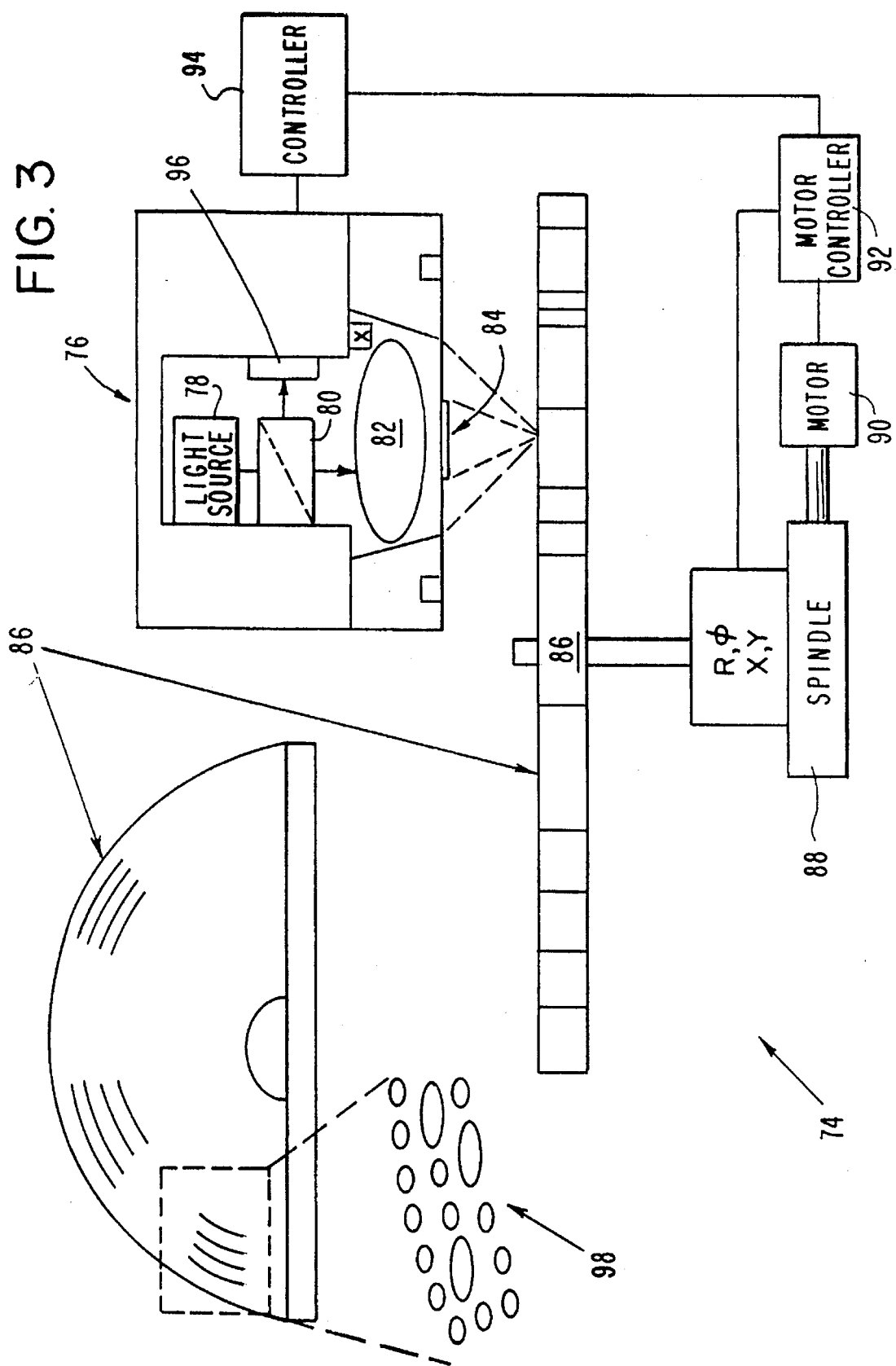
FIG. 3 illustrates an alternative embodiment of the invention comprising an integrated optical head including an antenna stripe, for example, made of a high refractive thin film acting as a probe.

In another specific embodiment, the FIG. 3 apparatus 74 illustrates an optical head unit 76 comprising a light source 78, a beam splitting element 80, a focusing element 82 (e.g., high NA lens or a Nomarski objective) and a scatterer probe 84, preferably comprising a thin metallic film.

The optical head 76 is used with a storage media 86 (e.g., rectangular or circular) preferably held on a positioning mechanism 88, including a means for positioning the scatterer probe 84 and focused beam 78 in close proximity (e.g., <100 angstroms) to the media 86 such that a multi-pole coupling interaction can develop between the scatterer probe 84 and a bit-feature of the media.

The positioning mechanism 88 can also be used to produce a fast translational or rotational motion between the sensing optical head unit 76 and the media surface 86. The positioning mechanism 88 is typically part of a focusing/tracking system capable of small lateral and vertical motions (e.g., a few micrometers to several centimeters) in order to displace the sensing head unit 76 at any preselected height and to any desired track of the media, for example, along a radial direction of the disc. Typically, this action may be provided by a combination of mechanical, electromechanical and/or piezo-electrical actuators. A fast translation is typically obtained by spinning a disc 86 supporting the encoded data by using a precise spindle mechanism 88, (e.g., air bearing spindle) a motor 90 and a motor controller 92 coupled with a principal electronic controller 94.

The light scattered from the probe 84 and the bits of the media 86 is collected through the objective 82 and supplied to a detector 96 whose output signal fed the controller 94. The principal controller 94 can decode tracking bits patterns from, for example, a subcode of data bits patterns 98 contained on the disc 86. A comparator circuit in association with the principal controller 94 allows sampling speed and performs a servo control of the motor controller 92. The principal controller 94 preferably includes a data processing circuit for accessing and converting the data read from the disc to a suitable code (e.g., audio, image data signal) for reproducing or displaying data.

In an alternative embodiment, a waveguide or a tapered metallized single-mode optical fiber element (E. R. Betzig et al., U.S. Pat. No. 5,272,330) can be used as a means for directing the incident light to the media.

Figure 4:
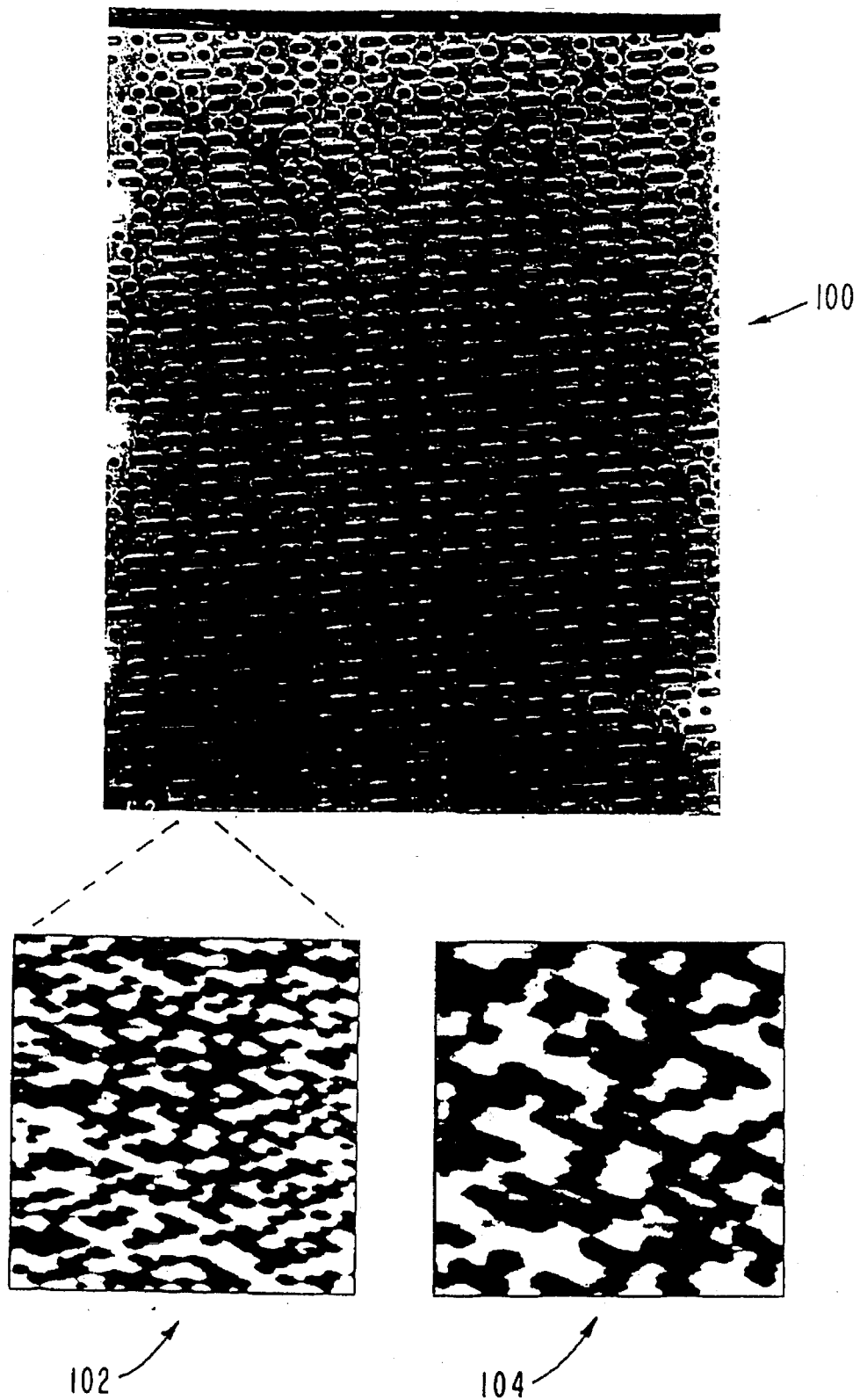
FIG. 4 illustrates in the practice of the invention, accessing/imaging of a high density bits pattern having 500 angstroms in spatial dimensions, impressed in a photoresist onto a silicon substrate by using an e-beam processing.

The FIG. 4 shows experimental results obtained in the practice of the present invention. The first electronic microscopic image 100 is an example of a bits pattern of a commercially available audio CD having about 650 MBytes storage capability. Essentially, the bit format corresponds to an area of approximately 1.6μ×0.8 μ and the closest packing with which individual bits can be resolved by conventional techniques is about 1 μ. The near-field optical images 102, 104 of a bits pattern impressed in a chromium coated photoresist onto a silicon substrate by using an e-beam processing were obtained with an apparatus as disclosed in the present application. The image 102 corresponds to 1 $\mu^2$ areas resolving small bits having 500 angstroms in spatial dimensions that are spaced by about 1000 angstroms, yielding a practical packing density of about 32 GBytes/in$^2$. This value can easily be envisioned to about 156 GBytes/in$^2$ for 200 angstroms bit-format. The image 104 provides a 0.5 $\mu^2$ area of data density. Measurements in a bandwidth of about 30 MHz showing a signal-to-noise ratio of about 50 dB has been achieved by the inventors demonstrating major advances in speed and density for optical data storage devices.

As articulated above, we have developed the detailed description of the novel method and apparatus of the present invention by first disclosing preferred apparatus (FIGS. 1–3). Utilization of such apparatus can yield information about high density data encoded in a media. (FIG. 4) We now turn our attention to how this information can be abstracted in an intelligible manner, to thereby actualize the steps of the novel method.

Since the optical dipole interaction varies as $r^{-3}$, a measured signal primarily derives from the scatterer. One can therefore assume that the scatterer can be modeled as a sphere of radius a, and polarizability $\alpha_t$, and that the bit feature that is being decoded has a polarizability $\alpha_f$ and radius a (although the theory could easily be generalized for any arbitrary feature size). If the scatterer and media are immersed in a driving electric field $E_i$ (caused by the incident radiation), and $\epsilon$ is the dielectric permittivity of the surrounding medium, the following coupled equations for the induced dipole moments $P_t$ and $P_f$ in the scatterer and bit feature respectively (FIG. 1) can be written as:

$$P_t = \alpha_t \epsilon (E_i + E_f) \tag{1}$$

$$P_f = \alpha_f \epsilon (E_i + E_t) \tag{2}$$

Here, $E_t$ and $E_f$ are the corresponding near-fields generated by the dipole moments of scatterer and bit-feature respectively. For the case where the spacing r between scatterer and bit-feature is greater than the diameter 2a, the dipole approximation can be used and the following expressions for $E_t$ and $E_f$ can be written:

$$E_t = -\frac{P_t}{\epsilon r^3} \tag{3}$$

$$E_f = -\frac{P_f}{\epsilon r^3} \tag{4}$$

Substituting for $E_t$ and $E_f$ in equations (1) and (2) and solving for $P_t$ and $P_f$ it is found, after eliminating terms of order less than $r^{-3}$, that:

$$P_t = \alpha_t \epsilon \left( 1 - \frac{\alpha_f}{r^3} \right) E_i \tag{5}$$

$$P_f = \alpha_f \epsilon \left( 1 - \frac{\alpha_t}{r^3} \right) E_i \tag{6}$$

Equations (5) and (6) show very clearly how the scatterer polarization couples with the bit-feature polarization to generate a polarization modulation term $$\Delta P = \frac{2\alpha_t \alpha_f \epsilon E_i}{r^3}.$$

It is this polarization modulation that produces a modulation in the scattered electric field $E_s$ as the scatterer bit-feature spacing r is modulated by vibrating the scatterer or moving the bit-feature relative to the scatterer. As mentioned earlier, equations (5) and (6) are derived for the case where r>2a the linear dimension of the dipole (for a sphere, this linear dimension is comparable to its diameter). The corresponding equations for arbitrary r can be obtained using quasi-static theory simply by changing r to $(r^2+a^2)3/2$ in equations (5) and (6). More general expressions for the polarization modulation $\Delta P$ and the polarizability modulation $\Delta\alpha$ are thus:

$$\Delta P = \frac{2\alpha_t \alpha_f \epsilon E_i}{(r^2+a^2)^{3/2}} \quad (7)$$

$$\Delta\alpha = \frac{2\alpha_t \alpha_f}{(r^2+a^2)^{3/2}} \quad (8)$$

From equations (7) and (8), $\Delta P$ and $\Delta\alpha$ decreases rapidly from their maximum values as the scatterer bit-feature spacing is increased ($\sim 1/r^3$). As it will be described later, for situations where ka<<1, $$(k = 2\pi \frac{n}{\lambda}$$

being the optical propagation constant in a medium of refractive index n) the scattered electric field modulation $\Delta E_s$ is directly proportional to $\Delta\alpha$; one can therefore expect to see a strong decrease in $\Delta E_s$ as the scatterer bit-feature dipole-dipole coupling decreases with increasing r. Furthermore, equations (7) and (8) show that $\Delta P$ and $\Delta\alpha$ are proportional to the product of the complex polarizability of the scatterer $\alpha_t$ and that of the bit-feature $\alpha_f$. Consequently, the phase of the scattered field component $\Delta E_s$ can change drastically depending on the complex polarizability of the scatterer as previously observed.

Now, the modulation $\Delta E_s$ of the scattered field $E_s$ caused by the polarizability modulation $\Delta\alpha$ can be calculated by applying the scattering matrix treatment used by van de Hulst (Light Scattering by Small Particles, Wiley, New York 1957) to study light scattering from small particles. For an incident field $E_i$, the spherically scattered wave has electric field $E_s$ at a distance d in the far field given by $$E_s = \frac{E_i}{ikd}(S); \Delta E_s = \frac{E_i}{ikd}(\Delta S) \quad (9)$$

where the relevant scattering matrix component S (which has both real and imaginary components) can be written in terms of the polarizability $\alpha$:

$$S = ik^3\alpha + \frac{2}{3}k^6\alpha^2; \Delta S = ik^3\Delta\alpha + \frac{2}{3}K^6(\Delta\alpha)^2 \quad (10)$$

and for a simple sphere of radius a, and complex refractive index m (relative to the surrounding medium)

$$\alpha = a^3 \frac{(m^2-1)}{(m^2+2)} \quad (11)$$

Note that imaginary terms of order $k^5$ and higher order terms in the expansion for S have been omitted as we are dealing with scattering from very small particles (i.e., ka<<1).

As just shown, the reflected wave from the back surface of the media is a concentric spherical wave of amplitude $$E'_r = \left(\frac{E_i}{5}\right)(\omega_0)\frac{n}{dNA},$$

where $$\omega_0 = \frac{\lambda}{\pi NA}$$

is the optical spot radius and NA is the numerical aperture of the objective lens. The expected phase difference $\Delta\phi$ between reference and signal beams is then $E_s/E_r$ or $\Delta\phi=5k^3\alpha NA^2/8\pi$. The reflected wave is phase advanced by $\pi/2$ with respect to the scattered wave. Thus from equations (9) and (10), the imaginary component of S will give rise to a scattered field $E_{s\phi}$ that is $\pi/2$ phase delayed with respect to $E'_r$ generating an overall phase shift, and the real component of S will give rise to a small scattered field $E_{se}$ that is $\pi$ out of phase with respect to $E'_r$ generating an overall extinction.

Let us first consider the case where $\alpha$ is purely real (i.e., m is real (silicon) or m is imaginary (gold)). The z-vibrating scatterer produces a modulation $\Delta S$, $\Delta E_{s\phi}$ respectively. $\Delta E_{se}$ interferes destructively with $E'_r$ to produce a fractional extinction $$\Delta \frac{p_e}{p}$$

of the reflected power in the spherical wave $E'_r$. Using equation (9) and the expression for $E'_r$ it becomes:

$$\Delta \frac{p_e}{p} = 2\frac{\Delta E_{se}}{E_r} = 5\frac{NA^2}{n^2} Re[\Delta S] \quad (12)$$

From the second term in equation (10) Re [is] (and Re [$\Delta S$]) vary as $(ka)^6$ and $$\Delta \frac{p_e}{P}$$

will yield a negligibly small signal as the scatterer size decreases substantially below 50 nm. This term is in Fact the Fractional power scattered by the particle—i.e., what is typically detected in NSOM's.

By contrast, in an interferometric system $\Delta E_{s\phi}$ gives rise to a phase shift $$\Delta\phi = \Delta \frac{E_{s\phi}}{E_r}$$

in the reflected beam. This phase change $\Delta\phi$ produces a fractional power change $$\Delta \frac{p_\phi}{p}$$

of $\Delta\phi$ at the photodiode (due to the differential phase detection system).

$$\frac{\Delta p_\phi}{p} = 2\frac{\Delta E_{s\phi}}{E_r} = 5\frac{NA^2}{n^2} Im[\Delta S] \quad (13)$$

Therefore from equation (10), this fractional power change varies only as $(ka)^3$. It is this dependence that gives reasonable S/N ratios at sub-wavelength resolution in the present invention and therefore, the possibility to decode high density data encrypted in bit patterns having spatial dimensions in a few nanometer range. (See FIG. 4).

Combining equations (12) and (13) with equations (8) and (9) and noting that the polarizability is related to the susceptibility $\chi$ by $$\alpha = \frac{\chi}{4\pi} \left( \frac{4}{3} \pi a^3 \right),$$

equations (12) and (13) can be written in terms of the susceptibilities $\chi_t$ and $\chi_f$ of scatterer and bit-feature respectively:

$$\Delta \frac{p_e}{p} = \frac{10}{9} (ka)^3 \frac{NA^2}{n^2} Im[\chi_t\chi_f] \quad (14)$$

$$\Delta \frac{p_\phi}{p} = \frac{10}{9} (ka)^3 \frac{NA^2}{n^2} Re[\chi_t\chi_f] \quad (15)$$

Therefore, both the real and imaginary parts of the susceptibility of a bit-feature can be determined—in principle down to the atomic scale—with two simultaneous measurements; the scatterer susceptibility being measured independently using a known reference surface as the media.

One can estimate the smallest bit-feature that may be detected with the FIG. 2 apparatus using some basic considerations. Taking a silicon or metal scatterer (i.e., $m^2$) of radius a and polarisability $\alpha$, we have, $$\Delta \phi = \frac{5}{2} k^3 a^3 NA^2.$$

For a coherent, shot noise limited phase detection system with 1 mW laser power, we can show that $\Delta\phi_{min} \cong 10^{-8}$ rad/$\sqrt{Hz}$. This would suggest that for He-Ne laser light ($\lambda$=633 nm) with NA=0.85, a≅1.7 angstroms, i.e., the smallest bit pattern format can reach the atomic level.

Now consider the general case where m is complex, $\alpha$ is complex. Returning to equation (10) and neglecting the second term, (as we are only concerned with resolving Features substantially below 50 nm), S will have both a real and imaginary part that produce scattered fields $E_s$ that vary as $(ka)^3$. Note that whereas in a dark-field measurement (like typical NSOM's), one will again be measuring scattered fractional powers that vary as $(ka)^6$, in here, the imaginary part of $\alpha$ will produce a fractional power change that varies as $(ka)^3$ as it is evident from equation (12); these power changes can be detected by orienting the Wollaston prism axis to be aligned with the Nomarski prism axis, so as to separately detect the optical powers in the two spots (without mixing) in the differential photodiode. Other work on light scattering from plasmon resonances in spheres and more recently from. STM tips are based on dark-field detection of the scattered optical power—i.e. $(ka)^6$ —signal dependence—and as before run into severe S/N problems at resolutions below 50 nm. However, the use of an interferometric system, as reported herein, demonstrates the ability to achieve the ultimate S/N and detection performance.

Note, in conclusion, that the disclosure corresponding to equations (1–15) can be developed, matatis mutandis, for a case wherein an external driving field comprises a magnetic field and induces magnetic dipole-dipole coupling, and for a case wherein an external driving electromagnetic field comprises both appreciable electrical and magnetic field components for inducing electromagnetic dipole-dipole coupling.

We claim:

1. An apparatus for decoding high density data encoded in a digital recording media as a series of tags comprising an information bit pattern including a tracking bit pattern, the apparatus comprising:

1) a source of electromagnetic radiation for generating an incident wave;

2) means for directing at least a portion of the incident wave to the media;

3) a scatterer probe acting as an antenna and capable of re-radiating a signal wave, said signal wave developing as an interactive coupling between a tag and said scatterer probe;

4) means for creating an interference signal based on the signal wave and a reference wave;

5) a high-speed detector for interrogating at least one of the phase and amplitude of the interference signal as a read-out signal;

6) means for interpreting and reproducing the read-out signal; and 7) means for detecting the tracking bit pattern and for controlling the reproduction of the information bit pattern.

2. An apparatus according to claim 1, wherein the source comprises a coherent source.

3. An apparatus according to claim 2, wherein the source comprises a laser beam.

4. An apparatus according to claim 3, wherein the source comprises a blue-green laser diode.

5. An apparatus according to claim 1, wherein the scatterer probe comprises one selected from the group consisting of a probe tip, a particle and a stripe.

6. An apparatus according to claim 5, wherein the scatterer probe has a high refractive index.

7. An apparatus according to claim 1, comprising a differential Nomarski interferometer for creating the interference signal.

8. An apparatus according to claim 1, comprising means for generating a time variable multi-pole interactive coupling by modulating at least one of the wavelength of the source, the relative positioning of the scatterer probe and the media, and using an external applied electromagnetic field at the scatterer probe-media interaction regions.

9. A method for decoding high density data encoded in a digital recording media as a series of tags comprising an information bit pattern including a tracking bit pattern, the method comprising the steps of:

1) providing an apparatus, said apparatus comprising:

i) a source of electromagnetic radiation for generating an incident wave;

ii) means for directing at least a portion of the incident wave to the media;

iii) a scatterer probe acting as an antenna and capable of re-radiating a signal wave, said signal wave developing as an interactive coupling between a tag and said scatterer probe;

iv) means for creating an interference signal based on the signal wave and a reference wave;

v) a high-speed detector for interrogating at least one of the phase and amplitude of the interference signal as a read-out signal;

vi) means for interpreting and reproducing the read-out signal; and vii) means for detecting the tracking bit pattern and for controlling the reproduction of the information bit pattern; and 2) accessing the high density data by engaging the media with the apparatus such that the scatterer probe can develop the interactive coupling with each of the series of tags in the presence of the incident wave so that a binary state can be defined.

10. A method according to claim 9, wherein the bit pattern has at least one spatial dimension below the diffraction limit.

11. A method according to claim 9, wherein the data are encoded in the form of physico-chemical inhomogeneities comprising absorbers in a scattering media.

12. A method according to claim 9, step 2, comprising optical access to data.

13. A method according to claim 9, wherein the bit pattern is magnetic.

14. A method according to claim 9, wherein the information bit pattern is encoded in a multispiral groove.

15. A method according to claim 9, comprising assessing the data at speeds of at least 30 MHz.

* * * * *